US006917486B2

(12) United States Patent
Tanner

(10) Patent No.: US 6,917,486 B2
(45) Date of Patent: Jul. 12, 2005

(54) DIRECT DETECTION OF COIL RESISTANCE

(75) Inventor: Brian Tanner, San Jose, CA (US)

(73) Assignee: Matsushita Electrical Industrial Co., Ltd., Osaka (JP)

( * ) Notice: Subject to any disclaimer, the term of this patent is extended or adjusted under 35 U.S.C. 154(b) by 164 days.

(21) Appl. No.: 10/623,459

(22) Filed: Jul. 18, 2003

(65) Prior Publication Data

US 2005/0013037 A1 Jan. 20, 2005

(51) Int. Cl.[7] .................................................. G11B 5/55
(52) U.S. Cl. ...................................... 360/75; 360/78.04
(58) Field of Search .......................... 360/75, 69, 78.04, 360/78.06, 78.09; 318/561, 254

(56) References Cited

U.S. PATENT DOCUMENTS

| | | | |
|---|---|---|---|
| 4,168,457 A | 9/1979 | Rose | |
| 4,524,398 A | 6/1985 | Fujiki | |
| 4,691,152 A | 9/1987 | Ell et al. | |
| 4,697,127 A | 9/1987 | Stich et al. | |
| 4,755,892 A | 7/1988 | Carteau et al. | |
| 4,864,437 A | 9/1989 | Couse et al. | |
| 4,876,491 A | 10/1989 | Squires et al. | |
| 4,920,462 A | 4/1990 | Couse et al. | |
| 4,933,785 A | 6/1990 | Morehouse et al. | |
| 4,967,291 A | 10/1990 | Touchton et al. | |
| 5,034,837 A | 7/1991 | Schmitz | |
| 5,119,250 A | 6/1992 | Green et al. | |
| 5,223,993 A | 6/1993 | Squires et al. | |
| 5,231,549 A | 7/1993 | Morehouse et al. | |
| 5,296,790 A | 3/1994 | Fincher | |
| 5,363,359 A | 11/1994 | Lee | |
| 5,379,171 A | 1/1995 | Morehouse et al. | |

(Continued)

FOREIGN PATENT DOCUMENTS

EP    1 115 064    7/2001

OTHER PUBLICATIONS

"Delta Voltage Control During Actuator Retract", IBM Technical Disclosure Bulletin, vol. 35, No. 1B, Jun. 1992, pp: 337–339.
R.E. Eaton et al., "Improved Back Electromagnetic Force Voice Coil Motor Controller", IBM Technical Disclosure Bulletin, vol. 38, No. 11. Nov. 1995 , pp: 315–316.
U.S. Appl. No. 10/368,743, filed Feb. 19, 2003.
U.S. Appl. No. 10/369,314, filed Feb. 19, 2003.
Morcos, Anthony C., "Voice Coil Actuators for Use in Motion Control Systems," Motion Magazine, 5 pp. Fall 1998.
"Advanced Servo–Mechanical Design Facilitates Improved Performance and Reliability," 4 pp., Nov. 1999, http://www.ibm.com/harddrive.
"How a Hard Disk Drive Works, Heads," Hard Disk Drive Guide, 2 pp., Nov. 6, 2002, http://www.duxcw.com/digest/guides/hd/hd5.htm.
Arkin, Michael, "Understanding Head Positioning Systems in Disk Drives—A Primer for the Dynamics of Servo Control," DataTech, Edition 3, Section 4, pp. 61–65, ICG Publishing.

*Primary Examiner*—David Hudspeth
*Assistant Examiner*—James L Habermehl
(74) *Attorney, Agent, or Firm*—Fliesler Meyer LLP

(57) ABSTRACT

Methods and computer program products for determining accurate estimates of coil resistance are provided. A voice coil voltage value and a corresponding voice coil current value are determined during a seek operation. Additionally, a velocity of the voice coil is determined based on servo information read from servo wedges of a disk during the seek operation. Coil resistance is estimated based on the voice coil voltage, the voice coil current and the velocity values.

20 Claims, 5 Drawing Sheets

U.S. PATENT DOCUMENTS

| | | | |
|---|---|---|---|
| 5,404,636 A | 4/1995 | Stefansky et al. | |
| 5,426,545 A | 6/1995 | Sidman et al. | |
| 5,485,323 A | 1/1996 | Anderson et al. | |
| 5,510,939 A | 4/1996 | Lewis | |
| 5,532,889 A | 7/1996 | Stefansky et al. | |
| 5,592,349 A | 1/1997 | Morehouse et al. | |
| 5,615,064 A | 3/1997 | Blank et al. | |
| 5,760,992 A | 6/1998 | Phan et al. | |
| 5,768,045 A | 6/1998 | Patton, III et al. | |
| 5,781,363 A | 7/1998 | Rowan et al. | |
| 5,844,743 A | 12/1998 | Funches | 360/78.04 |
| 5,863,393 A | 1/1999 | Hu | |
| 5,917,672 A | 6/1999 | Phan et al. | |
| 5,936,788 A | 8/1999 | Boutaghou et al. | |
| 5,949,608 A | 9/1999 | Hunter | |
| 5,982,130 A * | 11/1999 | Male | 318/615 |
| 6,064,539 A | 5/2000 | Null et al. | |
| 6,097,564 A | 8/2000 | Hunter | 360/78.04 |
| 6,115,199 A | 9/2000 | Bang | |
| 6,154,340 A | 11/2000 | Cameron | |
| 6,204,629 B1 | 3/2001 | Rote et al. | 360/75 |
| 6,222,696 B1 | 4/2001 | Kim | |
| 6,243,226 B1 | 6/2001 | Jeong | |
| 6,344,942 B1 | 2/2002 | Yarmchuk | |
| 6,363,214 B1 | 3/2002 | Merello et al. | |
| 6,487,033 B1 | 11/2002 | Heydt et al. | 360/60 |
| 6,496,319 B1 | 12/2002 | Kusumoto et al. | |
| 6,512,650 B1 | 1/2003 | Tanner | 360/75 |
| 6,560,057 B1 | 5/2003 | Klaassen et al. | 360/75 |
| 6,600,618 B2 | 7/2003 | Schlager | 360/75 |
| 6,611,118 B2 | 8/2003 | Abe et al. | 318/254 |
| 6,614,617 B1 | 9/2003 | Galloway | 360/78.06 |
| 6,643,088 B1 | 11/2003 | Kawachi | 360/75 |
| 6,661,598 B2 | 12/2003 | Kusumoto et al. | 360/75 |
| 6,690,536 B1 | 2/2004 | Ryan | 360/78.04 |
| 6,717,763 B2 | 4/2004 | Ottesen et al. | |
| 6,731,450 B1 * | 5/2004 | Codilian et al. | 360/75 |
| 6,781,787 B1 | 8/2004 | Codilian et al. | |
| 6,795,268 B1 | 9/2004 | Ryan | 360/78.04 |
| 2002/0054451 A1 * | 5/2002 | Moon et al. | 360/78.06 |
| 2004/0160695 A1 * | 8/2004 | Zayas et al. | 360/75 |
| 2004/0160698 A1 * | 8/2004 | Zayas et al. | 360/75 |

* cited by examiner

DIRECT DETECTION OF COIL RESISTANCE

CROSS REFERENCE TO RELATED APPLICATIONS

This application relates to the following co-pending applications: U.S. patent application Ser. No. 10/369,314, entitled ACCURATE TRACKING OF COIL RESISTANCE, filed Feb. 19, 2003; and U.S. patent application Ser. No. 10/368,743, entitled ACCURATE TRACKING OF COIL RESISTANCE BASED ON CURRENT, VOLTAGE AND ANGULAR VELOCITY, filed Feb. 19, 2003.

FIELD OF THE INVENTION

The present invention relates to rotating storage media devices, and more specifically curate tracking of the resistance of a voice coil of a rotating storage media device.

BACKGROUND

During normal operation of a rotating storage media device, a read/write head senses servo signals stored on a disk while the head is located over the disk surface. A servo controller interprets the servo signals, and uses these servo signals to adjust the head's position relative to the disk surface. The servo controller moves the head, either to maintain a desired head position or to travel to a new position, by moving an actuator arm whose tip is secured to the head.

Various methods have been used to attempt to estimate head position by analyzing certain electrical characteristics of an actuator's voice coil motor (VCM). A VCM, which is used to position the actuator arm, generally includes a wound conductive coil (called a voice coil, or actuator coil) secured to the actuator arm, and one or more magnets. The coil is positioned within the magnetic field of the magnets. Driving a current through the voice coil creates a magnetic force that moves the voice coil (and thus, the actuator arm and the head) relative to the magnet(s).

Estimates of voice coil velocity (e.g., state space estimations) are used to estimate the position of the voice coil, the actuator arm and the head. Methods for estimating the velocity of the voice coil (and thereby, of the actuator arm and the head) typically rely on accurate determinations of the back electromagnetic field voltage (back EMF voltage, or simply $V_{BEMF}$) present across the voice coil, which is due to the coil's motion through the field of the magnets. More specifically, since the $V_{BEMF}$ is proportional to the voice coil's angular velocity in the ratio of a known constant, it can be used to determine the velocity of the voice coil. For example, the angular velocity of the voice coil can be determined using the following equation:

$$\omega = \frac{1}{K_T} V_{BEMF} \quad \text{(Equation 1)}$$

where: $\omega$ is the angular velocity of the voice coil; $K_T$ is a torque constant; and $V_{BEMF}$ is the back electromagnetic field voltage drop.

Further, the $V_{BEMF}$ can be determined using the following equation:

$$V_{BEMF} = V_{coil} - I_{coil} R_{coil} - L\, di/dt \quad \text{(Equation 2)}$$

where $V_{coil}$ is the voltage across the voice coil, $I_{coil}$ is the current through the voice coil, $R_{coil}$ is the resistance of the voice coil, and $L\, di/dt$ is the voltage across the coil due to a change in current. Combining the above equations gives:

$$\omega = \frac{1}{K_T}\left(V_{coil} - I_{coil} R_{coil} - L\frac{di}{dt}\right). \quad \text{(Equation 3)}$$

Thus, $R_{coil}$, sometimes referred to as VCM resistance, is necessary to determine the angular velocity of the voice coil. Typically, resistance of a voice coil (i.e., $R_{coil}$) is determined when the actuator arm is urged against a crash stop, which prevents the arm from moving. When the actuator arm is not moving, the voice coil is also not moving, causing the back EMF (i.e., $V_{BEMF}$) to be zero, and the voltage across the voice coil (i.e., $V_{coil}$) to be entirely due to coil resistance ($R_{coil}$), assuming enough time has passed to allow di/dt to also be zero. In this manner, coil resistance has been conventionally measured. However, when the actuator arm is traversing a load/unload ramp, or while over the media, the coil resistance may change due to environmental variations, such as temperature variations. Accordingly, there is a need to more accurately keep track of the coil resistance.

Because conventional methods typically determine the resistance of a voice coil (i.e., $R_{coil}$) only when the actuator arm is urged against a crash stop, there is typically an intermediate step of moving the actuator arm against the crash stop each time a park operation (i.e., ramp load) is to be performed. This intermediate step of moving the actuator arm against the crash stop is highly undesirable for a number of reasons, including because the velocity of the head may preclude movement of the head towards the crash stop without unintentional uncontrolled movement along the load/unload ramp. Accordingly, there is a need to avoid this undesirable intermediate step of moving the actuator arm against the crash stop each time the actuator arm is to be parked.

DETAILED DESCRIPTION

Figure 1:
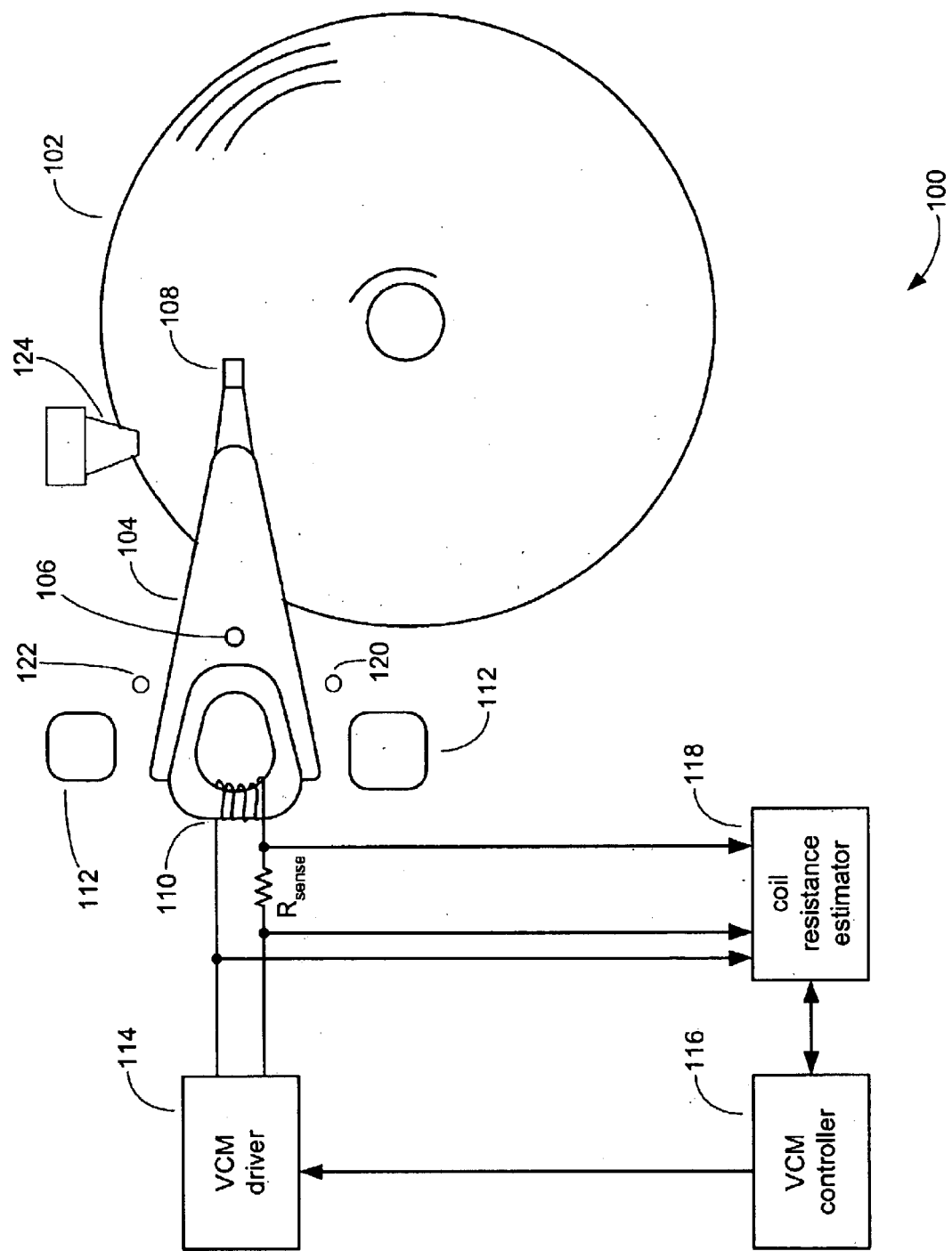
FIG. 1 is a diagram showing portions of an exemplary rotating storage media device.

Embodiments of the present invention relate to rotating storage media drives, such as, but not limited to, disk drives. FIG. 1 is a high level diagram showing portions of an exemplary disk drive 100. As shown in FIG. 1, the drive 100 includes a disk 102, which may include one or more magnetic digital data storage disks or optical disks. An actuator arm 104 is positioned proximate the disk 102, and pivots about a point 106 (e.g., which may be an actuator shaft). Attached to the actuator arm 104 is a read/write head 108, which can include one or more transducers for reading data from and writing data to a magnetic medium, an optical head for exchanging data with an optical medium, or another suitable read/write device. Also, attached to the actuator arm 104 is an actuator coil 110, which is also known as a voice coil or a voice actuator coil. The voice coil 110 moves relative to one or more magnets 112 when current flows through the voice coil 110. The magnets 112 and the actuator coil 110 are parts of a voice coil motor (VCM), which applies a force to the actuator arm 104 to rotate it about the pivot point 106.

The drive 100 is also shown as including a VCM driver 114, also known as an actuator driver. A VCM controller 116 (which can be part of a servo controller) guides the actuator arm 104 to position the read/write head 108 over a desired track, and moves the actuator arm 104 up and down a ramp 124. The ramp 124 will typically include a latch (not shown) to hold the actuator arm 104 when in the parked position. A sense resistor ($R_{sense}$), discussed in more detail in the discussion of FIG. 2, is shown as being is series with the voice coil 110. A coil resistance estimator 118, of the present invention, can provide accurate estimates of coil resistance. The drive 100 also includes crash stops 120 and 122. Additional components, such as a disk drive housing, bearings, etc. which have not been shown for ease of illustration, can be provided by commercially available components, or components whose construction would be apparent to one of ordinary skill in the art reading this disclosure.

Typically, the resistance of the voice coil 110 is only determined when the actuator arm 104 is urged against crash stop 120 or 122, which prevents the arm 104 from moving. When the actuator arm 104 is not moving, the voice coil 110 is also not moving, causing the back EMF (i.e., $V_{BEMF}$) to be zero. Thus, while urged against crash stop 120 or 122, the voltage across the voice coil 110 (i.e., $V_{coil}$) is due entirely to coil resistance ($R_{coil}$), if enough time has passed to allow di/dt to also be zero. In this manner, coil resistance has been conventionally measured, as mentioned above. However, when the actuator arm 104 is moving up or down the ramp 124, or when the actuator arm 104 is over the disk 102 (and the head 108 is tracking or seeking, which may include when in settle state), the coil resistance may change due to environmental variations, such as temperature. In other words, the actual coil resistance when the actuator arm 104 is not against one of the crash stops 120 or 122 will often be different than the coil resistance determined in the conventional manner (i.e., when the actuator arm 104 is against one of the crash stops 120 or 122).

As mentioned above, accurate coil resistance estimates are necessary to accurately determine the velocity of the coil. More generally, accurate coil resistance estimates can be used to produce accurate back EMF estimates, which in turn can be used to accurately determine the velocity of the coil 110 (and thereby, the velocity and position of the actuator arm 104 and the head 108). For example, when the actuator arm 104 is moving up or down the ramp 124, during ramp load or unload, the head 108 is not reading servo information from disk 102. Thus, during the ramp load or unload period, the velocity and position of the actuator arm 104 may rely primarily (or even entirely) on back EMF determinations. Accordingly, there is a need for more accurate estimates of coil resistance. Embodiments of the present invention are directed to providing such accurate estimates of the coil resistance (e.g., accurate estimates of the resistance of actuator coil 110).

Figure 2A:
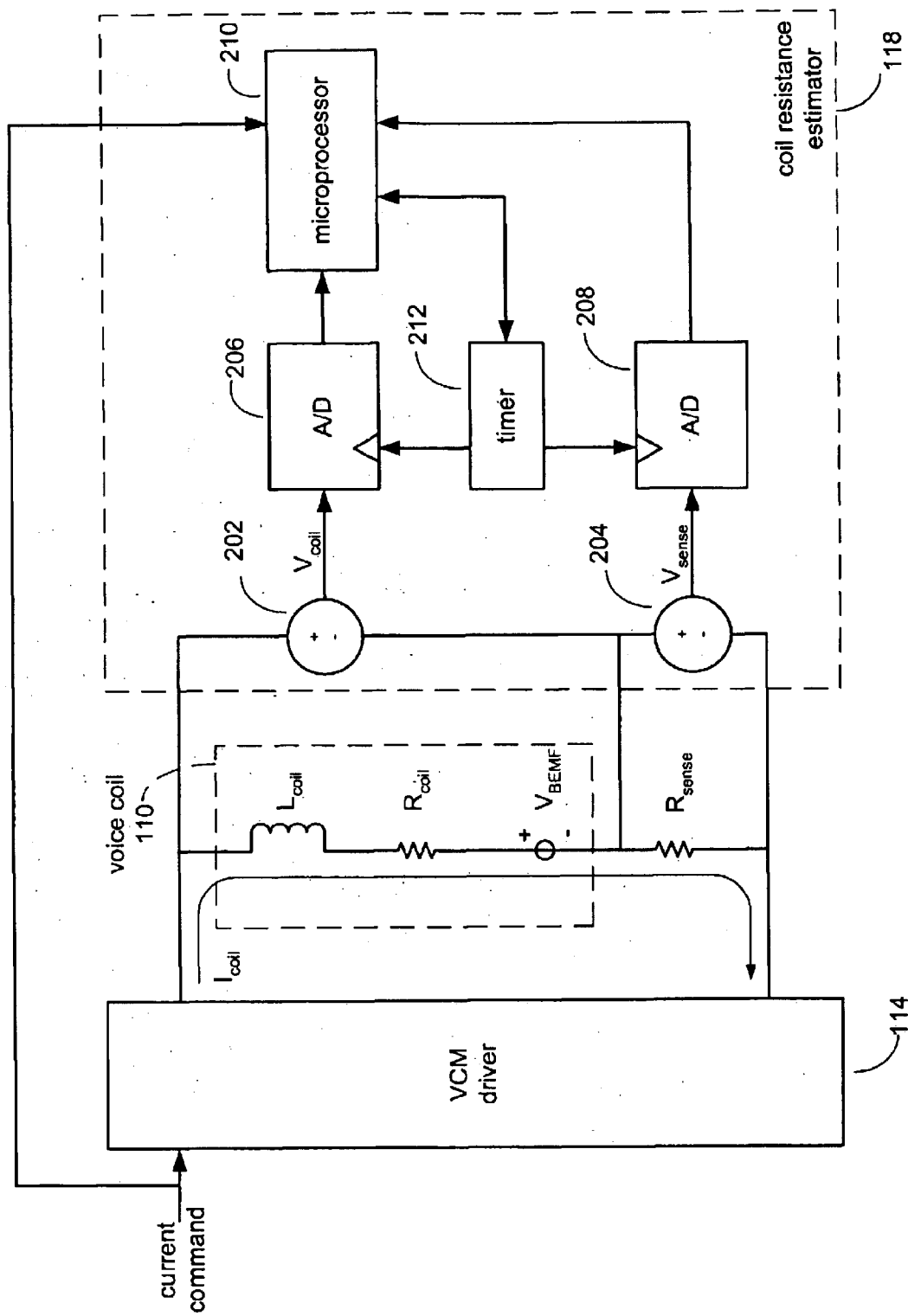
FIGS. 2A and 2B are diagrams showing exemplary subsystems for estimating coil resistance using embodiments of the present invention.

Referring now to FIG. 2A, the VCM driver 114 provides a voice coil current ($I_{coil}$) that flows through the voice coil 110. The voice coil 110 is shown as including a resistance (represented as resistor $R_{coil}$), an inductance (represented by $L_{coil}$) and a back EMF voltage (represented by $V_{BEMF}$). A sense resistor ($R_{sense}$) is in series with the voice coil 110. The sense resistor ($R_{sense}$) is used to sense the voice coil current ($I_{coil}$) through the voice coil 110. Preferably, the sense resistor ($R_{sense}$) has a relatively small resistance as compared to overall resistance of the voice coil 110. Further, the sense resistor ($R_{sense}$) is preferably highly insensitive to environmental changes (e.g., temperature changes).

A summer 202 (or more specifically, a subtracter 202, which can be, for example, an operational amplifier) is coupled across the voice coil 110 to thereby output the voltage drop across the coil ($V_{coil}$). Similarly, a summer 204 (or more specifically a subtracter 204, e.g., an operational amplifier) is coupled across the sense resistor ($R_{sense}$) to thereby output the voltage drop across the sense resistor ($V_{sense}$). As can be appreciated from FIG. 2, $V_{coil}$ is equal to the voltage drop across $I_{coil}$, plus the voltage drop across $R_{coil}$ (also known as IR drop), plus $V_{BEMF}$. That is, $V_{coil}$ can be represented by the following equation:

$$V_{coil} = L\ di/dt + I_{coil}R_{coil} + V_{BEMF} \qquad \text{(Equation 4)}.$$

In operation, the VCM driver 114 receives a digital current command signal (e.g., from the VCM controller 116). The VCM driver 114 converts the digital current commands into an actual current signal, i.e., the voice coil current ($I_{coil}$) The voice coil current flows through the voice coil 110 and the sense resistor ($R_{sense}$), as shown in FIG. 2. The subtracter 202 outputs a voice coil voltage ($V_{coil}$) signal, which is provided to an analog-to-digital (A/D) converter 206. The A/D 206 provides digital samples of the voice coil voltage signal to a microprocessor 210. In accordance with an embodiment of the present invention, the microprocessor 210 also receives the digital current commands. As explained in more detail below, the microprocessor 210 can then determine accurate estimates of the coil resistance using embodiments of the present invention.

The voice coil current ($I_{coil}$) also flows through the sense resistor ($R_{sense}$). In accordance with an embodiment of the present invention, the subtracter 204 outputs a sense voltage ($V_{sense}$) signal, which is provided to an A/D 208. The A/D 208 provides digital samples of the sense voltage to the microprocessor 210. In embodiments where the sense resistor is highly insensitive to environmental changes (e.g., temperature changes), the microprocessor 210 can determine the voice coil current ($I_{coil}$) by dividing the digital samples of the sense voltage ($V_{sense}$) by a known resistance of the sense resistor ($R_{sense}$).

Figure 2B:
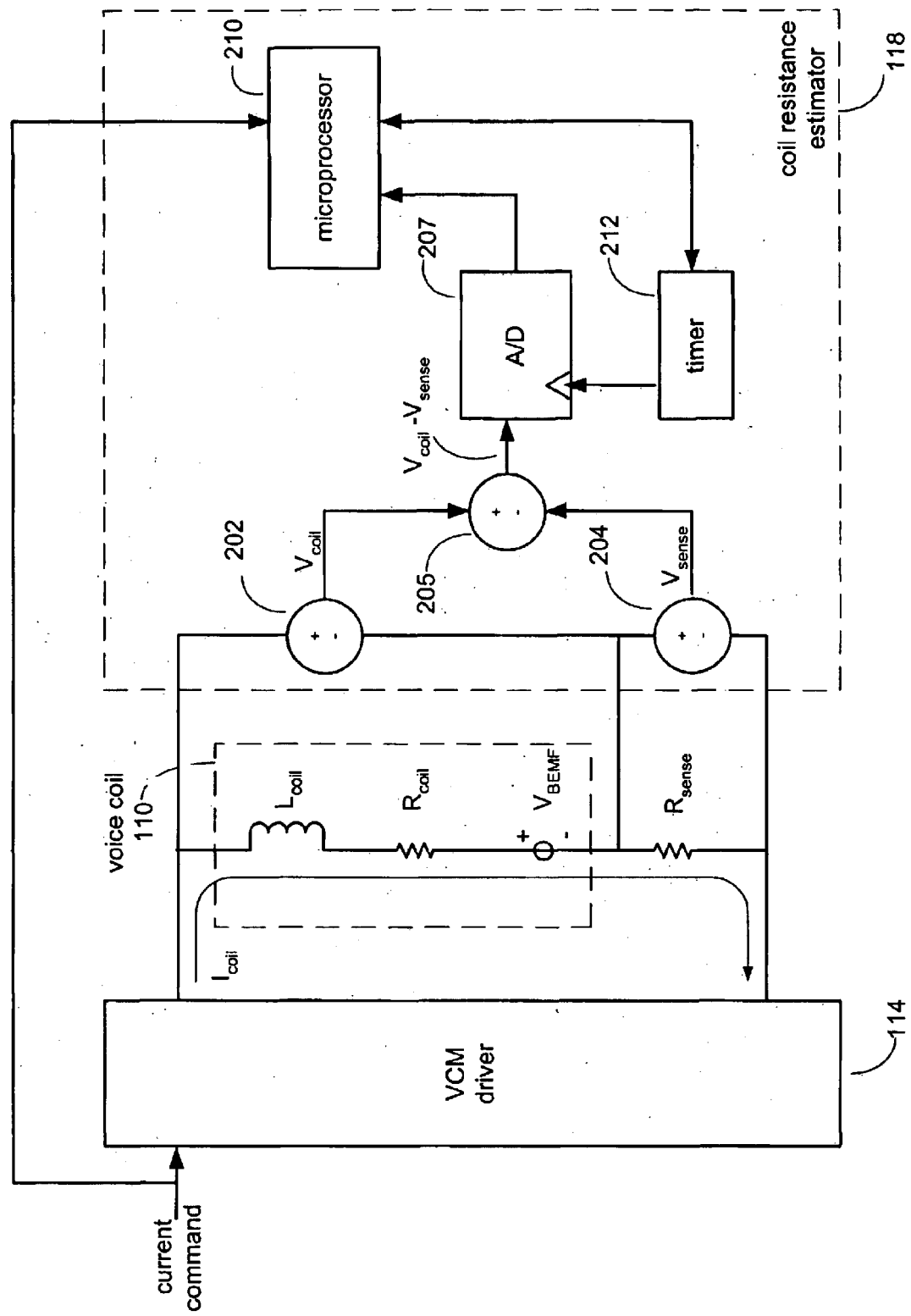

Alternatively, as shown in FIG. 2B, a single analog-to-digital converter can be used (rather than two analog-to-digital converters 206 and 208, as shown in FIG. 2A). In this alternative arrangement, $V_{sense}$ (i.e., the output of subtracter 204) and $V_{coil}$ (the output of subtracter 202) are provided to another subtracter 205 that subtracts $V_{sense}$ from $V_{coil}$, thereby producing a voltage signal $V_{coil} - V_{sense}$ that is provided to the single analog-to-digital converter 207. The output of the single analog-to-digital converter 207 is then provided to the microprocessor 210, which also receives the current command signals, as previously described. Since the commanded current is known, and $R_{sense}$ is known (and highly insensitive to environmental changes), the microprocessor 210 can accurately calculate that $V_{sense}$ equals $I_{coil}$ (as commanded) multiplied by $R_{sense}$. Accordingly, the microprocessor 210 can measure $V_{coil}$ by adding the calculated $V_{sense}$ to the voltage value output by the single digital-to-analog converter 207. In other words, $V_{coil}$=measured ($V_{coil} - V_{sense}$)+calculated ($V_{sense}$), where the measured ($V_{coil} - V_{sense}$) is the output of the single analog-to-digital converter 207, and the calculated ($V_{sense}$) is based on the commanded current and the known value of $R_{sense}$.

In accordance with embodiments of the present invention, in order to produce good estimates of coil resistance ($R_{coil}$), measurements of coil voltage ($V_{coil}$) (and measurements of coil current ($I_{coil}$), if they are made) are preferably high enough to overwhelm potential noise, but not so high that the VCM driver 114 is operating in saturation. The coil voltage ($V_{coil}$) and coil current ($I_{coil}$) are generally high during seek operations, and generally highest during the beginning and end of seek operations (i.e., during acceleration and during deceleration). During the beginning of a seek operation (i.e., during initial acceleration of the voice coil 110, and therefore, also of the actuator 104 and head 108), the VCM controller 116 typically drives the VCM driver 114 into saturation. During saturation, more current is demanded from the VCM driver 114 than it can provide, forcing the VCM driver to output its maximum current, which results in maximum acceleration with relatively low power dissipation. Although control of the voice coil 110 is generally not very accurate during saturation, this is acceptable during the beginning of acceleration. On the other hand, accurate control of the voice coil 110 (and thus the hactuator 104 and the head 108) is necessary during deceleration of the voice coil 110 so that the head is positioned over the correct track at the end of a seek. Accordingly, during the end of a seek operation (i.e., during deceleration), the VCM driver 114 is typically not driven into saturation.

Figure 3:
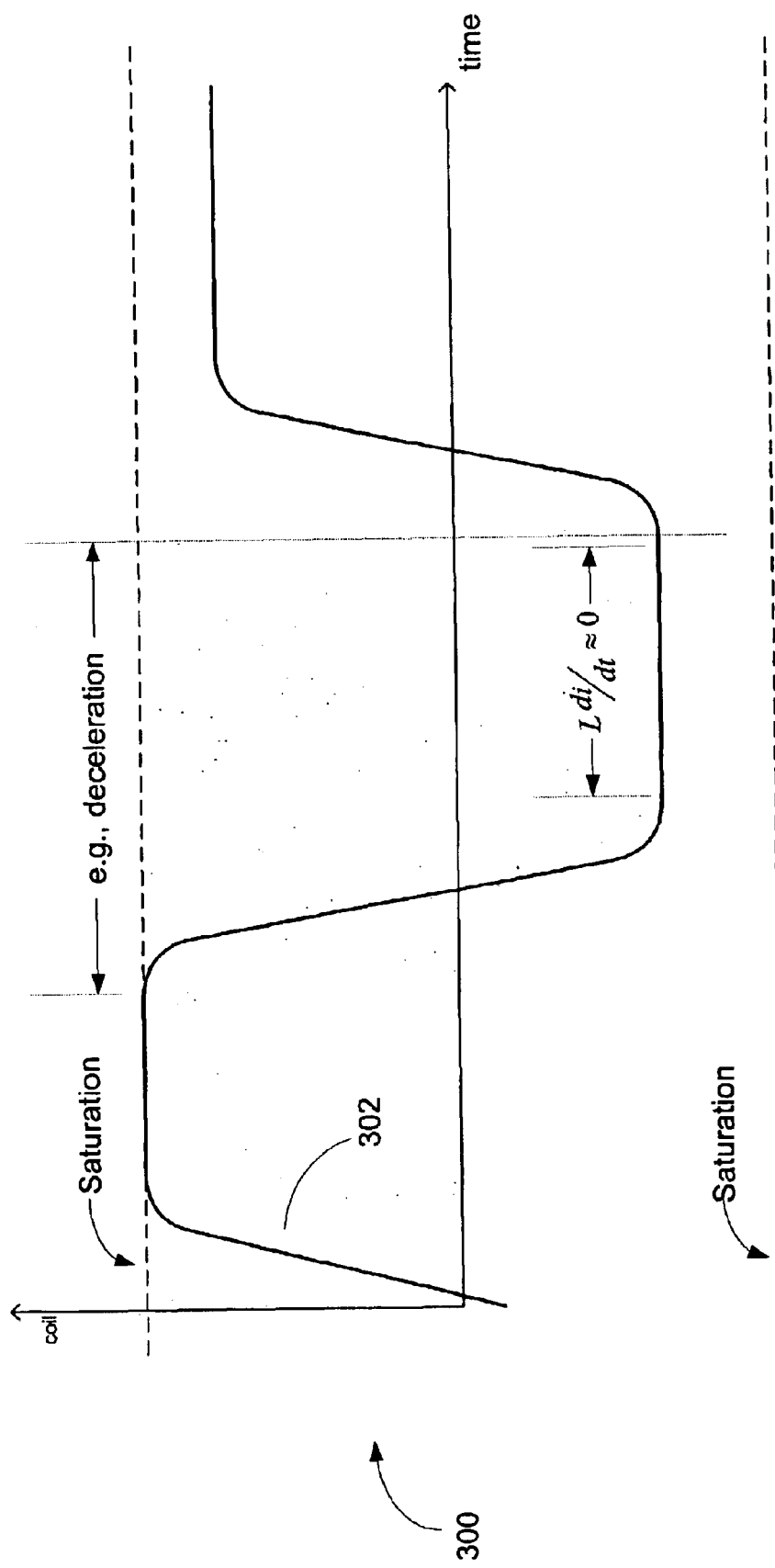
FIG. 3 illustrates an exemplary voice coil current signal during a seek operation.

When the voice coil 110 is decelerating near the end of a seek operation, the current through the voice coil current ($I_{coil}$) is relatively high, but not in saturation. An example of this is shown in FIG. 3, which includes a graph 300 showing voice coil current ($I_{coil}$) versus time. Additionally, during a majority of the deceleration period, the coil voltage ($V_{coil}$) is still relatively high. When the voice coil current ($I_{coil}$) and the voice coil voltage ($V_{coil}$) are relatively high, they will generally overwhelm noise that may be present. In other words, the signal-to-noise (S/N) ratio should be good when the voice coil current ($I_{coil}$) and the voice coil voltage ($V_{coil}$) are relatively high. Further, during the deceleration period, the voice coil current ($I_{coil}$) generally sweeps in one direction (up or down), and then levels off for a period (i.e., remains relatively constant), before sweeping back in the other direction (down or up) near the very end of deceleration. This can be appreciated from graph 300 shown in FIG. 3. While the voice coil current ($I_{coil}$) is relatively constant, the voltage due to a change in current (i.e., L di/dt) will be very low, allowing for the assumption that L di/dt≈0. This allows Equation 4 to be rewritten as follows:

$$V_{coil} \approx I_{coil} R_{coil} + V_{BEMF} \quad \text{(Equation 5)}.$$

Combining Equations 1 and 5 results in:

$$R_{coil} \approx \frac{V_{coil} - \omega K_T}{I_{coil}}. \quad \text{(Equation 6)}$$

During seek operation, the actual angular velocity ($\omega$) of the voice coil 110 can be determined, using well known techniques, based on servo information that the head 108 reads from servo wedges located on the disk 102. Thus, $\omega K_T$ can be determined. Additionally, $V_{coil}$ and $I_{coil}$ can be determined, as just explained above in the discussion of FIGS. 2A and 2B, allowing $R_{coil}$ to be estimated in accordance with embodiments of the present invention. More specifically, in accordance with an embodiment of the present invention, $R_{coil}$ is estimated using Equation 6 shown above. In accordance with an embodiment of the present invention, the $V_{coil}$ and $I_{coil}$ measurements are made (e.g., using the system shown in FIG. 2A or 2B) during the deceleration portion of a seek operation, preferably while the $I_{coil}$ is relatively settled (as described with reference to FIG. 3). In accordance with an embodiment of the present invention, the value(s) for coil resistance ($I_{coil}$), used to estimate coil resistance ($R_{coil}$), are (or are based on) current command values. In accordance with another embodiment of the present invention, the values for $I_{coil}$, used to estimate coil resistance $R_{coil}$, are (or are based on) current measurements produced using the sense resistor ($R_{sense}$). More specifically, where the coil current values are current measurements, the current measurements can be determined based on the sampled voltages across the sense resistor ($R_{coil}$) (e.g., current measured voltage sampled/know resistance of the sense resistor). Where the coil current values are based on current commands, the microprocessor 210 determines the current values based on the current command values.

Referring specifically to FIG. 3, the graph 300 illustrates an exemplary voice coil current signal ($I_{coil}$) 302, over time, while the head 108 is seeking. When the head 108 is accelerating during the beginning of a seek operation, the voice coil current 302 goes into saturation. When the head 108 begins to decelerate the current swings in the opposite direction, and then settles for a period of time, before swinging back in the opposite direction.

Figure 4:
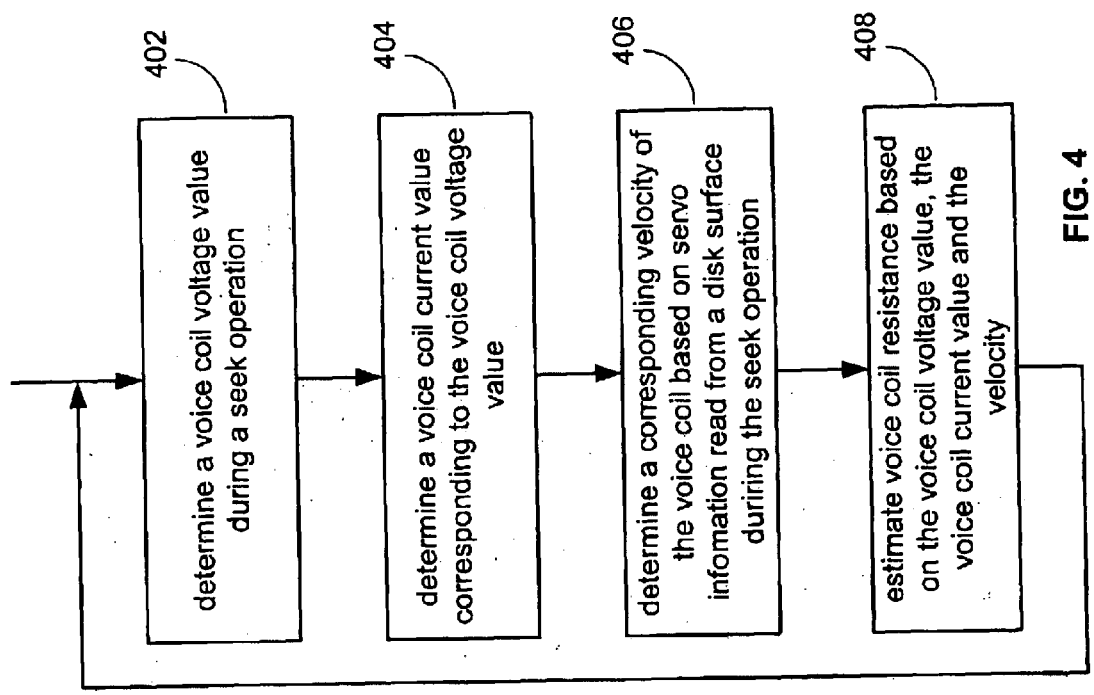
FIG. 4 is high level flow diagrams useful for describing embodiments of the present invention.

The flow diagram in FIG. 4 will not be used to summarize embodiments of the present invention. At a step 402, a voice coil voltage value is determined based on at least one voltage sample produced during a seek operation. Referring back to FIG. 2A, the voice coil value can be determined by using the A/D 206 to sample the output of the subtracter 202. The output of the A/D 206, which is the voice coil voltage ($V_{coil}$) value, is provided to the microprocessor 210. Referring to FIG. 2B, the voice coil voltage ($V_{coil}$) value can alternatively be determined by using the A/D 207 to sample the output of the subtracter 205. The output of the A/D 207, which is equal to the voice coil voltage value minus a sense resistor voltage value ($V_{coil}-V_{sense}$) is provided to the microprocessor 210. As shown in FIG. 2B, the microprocessor 210 also receives the coil current ($I_{coil}$) command that produced the sampled $V_{coil}-V_{sense}$. Since the resistance of $R_{sense}$ is known by the microprocessor 210, the microprocessor 210 can determine $V_{sense}$ based on the coil current ($I_{coil}$) command and the resistance of $R_{sense}$, i.e., $V_{sense}=I_{coil} \cdot R_{sense}$. The microprocessor 210 can then determine $V_{coil}$ by adding $V_{sense}$ to the sample received from A/D 207, i.e., $V_{coil}=(V_{coil}-V_{sense})+V_{sense}$.

Returning to the flow chart of FIG. 4, at a step 404, a voice coil current ($I_{coil}$) value, corresponding to the voice coil voltage ($V_{coil}$) value is determined. Referring again back to FIG. 2A, the voice coil current value ($I_{coil}$) can be determined by using the A/D 208 to sample the output of the subtracter 204. The output of the A/D 208, which is equal to the voltage ($V_{sense}$) across the sense resistor $R_{sense}$ is provided to the microprocessor 210. Since the resistance of $R_{sense}$ is known by the microprocessor 210, the microprocessor 210 can determine $I_{coil}$ based on $V_{sense}$ and $R_{sense}$, i.e., $I_{coil}=V_{coil}/R_{coil}$. Referring to FIGS. 2A and 2B, the microprocessor 210 can alternatively determine $I_{coil}$ based on the current command, as was just explained.

Returning again to the flow chart of FIG. 4, at a step 406, a corresponding coil velocity ($\omega$) value is determined. This is most likely determined based on the servo information that is being read from the surface of the disk, as is well known in the art.

Finally, at a step 408, the resistor of the voice coil ($R_{coil}$) is estimated based on the voice coil voltage ($V_{coil}$), the voice coil current ($I_{coil}$), and the voice coil velocity ($\omega$) values, which were determined during the seek operation. The torque constant ($K_T$) of the voice coil 110 is known by the microprocessor. Accordingly, the microprocessor 110 can estimate $R_{coil}$ using Equation 6, discussed above.

In accordance with an embodiment of the present invention, the above described steps 402, 404 and 406 are performed while the VCM driver 114 is not in saturation. This is important because the signal-to-noise ratio of sampled signals will be much better when the VCM driver 114 is not in saturation. Additionally, this is important in embodiments of the present invention where voice coil current values are determined based on current commands, because the current commands are not accurate estimates of the actual voice coil current ($I_{coil}$) when the VCM driver 114 is in saturation. In accordance with an embodiment of the present invention, steps 402, 404 and 406 are specifically performed during deceleration of the voice coil 110, and preferably, during a portion of the deceleration where the voice coil current ($I_{coil}$) is expected to be substantially settled, allowing for the assumption that L di/dt≈0

In summary, in accordance with various embodiments of the present invention, voice coil resistance ($R_{coil}$) estimates are determined based on voice coil voltage, current and velocity values that are determined when the VCM driver 110 is not in saturation. Since the VCM driver 110 is not in saturation during the majority of the voice coil's deceleration, the voice coil voltage, current and velocity values are, in accordance with an embodiment of the present invention, determined during deceleration, and preferably when the voice coil current is substantially constant (i.e., substantially settled). Multiple samples can be produced and then averaged to produce the voice coil voltage and current values at steps 402 and 404, but this is not required. Steps 402–408 can repeated over time, to thereby constantly estimate the coil resistance ($R_{coil}$).

The steps of the flow diagram are not necessarily performed in the order shown. For example, the voice coil voltage and voice coil current values determined at steps 402 and 404 can be determined in parallel. Accordingly, embodiments of the present invention should not be limited to the precise order shown.

As explained above, the steps of the flow diagrams of FIG. 4 can be performed using the architectures shown in FIGS. 2A and 2B. However, these steps can be performed using other architectures, and accordingly the methods of the present invention are not intended to be limited to use with the architectures shown in FIGS. 2A and 2B.

Embodiments of the present invention may be implemented using a conventional general purpose or a specialized digital computer or microprocessor(s) programmed according to the teachings of the present disclosure, as will be apparent to those skilled in the computer art. Appropriate software coding can readily be prepared by skilled programmers based on the teachings of the present disclosure, as will be apparent to those skilled in the software art. The invention may also be implemented by the preparation of integrated circuits or by interconnecting an appropriate network of conventional component circuits, as will be readily apparent to those skilled in the art.

Many features of the present invention can be performed using hardware, software, firmware, or combinations thereof. Consequently, features of the present invention may be implemented using a processing system (e.g., including one or more processors) within or associated with a rotating storage media device (e.g., disk drive 100).

Features of the present invention can be implemented in a computer program product which is a storage medium (media) having instructions stored thereon/in which can be used to program a processing system to perform any of the features presented herein. The storage medium can include, but is not limited to ROMs, RAMs, EPROMs, EEPROMs, DRAMs, VRAMs, flash memory devices, or any type of media or device suitable for storing instructions and/or data.

Stored on any one of the machine readable medium (media), the present invention can include software and/or firmware for controlling the hardware of a processing system, and for enabling a processing system to interact with other mechanism utilizing the results of the present invention. Such software or firmware may include, but is not limited to, application code, device drivers, operating systems and execution environments/containers.

Features of the invention may also be implemented primarily in hardware using, for example, hardware components such as application specific integrated circuits (ASICs). Implementation of the hardware state machine so as to perform the functions described herein will be apparent to persons skilled in the relevant art(s).

While various embodiments of the present invention have been described above, it should be understood that they have been presented by way of example, and not limitation. It will be apparent to persons skilled in the relevant art that various changes in form and detail can be made therein without departing from the spirit and scope of the invention.

The present invention has been described above with the aid of functional building blocks illustrating the performance of specified functions and relationships thereof. The boundaries of these functional building blocks have often been arbitrarily defined herein for the convenience of the description. Alternate boundaries can be defined so long as the specified functions and relationships thereof are appropriately performed. Any such alternate boundaries are thus within the scope and spirit of the claimed invention.

The breadth and scope of the present invention should not be limited by any of the above-described exemplary embodiments, but should be defined only in accordance with the following claims and their equivalents.

I claim:

1. A method for determining accurate estimates of voice coil resistance in a system including a voice coil motor driver (VCM driver) that drives a voice coil of a voice coil motor (VCM), the method comprising:
    (a) determining at least one voice coil voltage value and at least one corresponding voice coil current value, during a seek operation;
    (b) determining at least one voice coil velocity value based on servo information read from servo wedges of a disk during the seek operation; and
    (c) estimating voice coil resistance based on the determined voice coil voltage, current and velocity values.

2. The method of claim 1, wherein steps (a) and (b) are performed while the VCM driver is not in saturation.

3. The method of claim 2, wherein steps (a) and (b) are performed during deceleration of the voice coil.

4. The method of claim 3, wherein steps (a) and (b) are performed during a portion of the deceleration where voice coil current is substantially settled.

5. The method of claim 1, wherein step (a) includes determining each voice coil current value based on a current command.

6. The method of claim 1, wherein step (a) includes determining each voice coil current value based on a voltage measurement across a sense resistor.

7. The method of claim 1, wherein step (a) includes determining the at least one voice coil voltage value based on at least one voltage sample produced during the seek operation.

8. The method of claim 1, wherein step (c) comprises estimating voice coil resistance using the following equation:

$$R_{coil}=(V_{coil}-\omega K_T)/I_{coil},$$

where
- $R_{coil}$ is the estimated coil resistance;
- $V_{coil}$ is the coil voltage measured during a seek deceleration;
- $I_{coil}$ is the corresponding coil current during the seek deceleration;
- $\omega$ is the corresponding coil velocity, during the seek deceleration, as determined based on servo information; and
- $K_T$ is a known constant.

9. The method of claim 8, wherein the voice coil current value is determined based on a current command.

10. The method of claim 8, wherein the voice coil current value is based on a voltage measured across a sense resistor.

11. The method of claim 1, wherein steps (a), (b) and (c) are repeated a plurality of time so that the voice coil resistance is continually estimated.

12. A machine readable medium having instructions stored thereon that when executed by a processor cause a system to:

determine at least one voice coil voltage value and at least one corresponding voice coil current value, during a seek operation;

determine at least one voice coil velocity value based on servo information read from servo wedges of a disk during the seek operation; and estimate voice coil resistance based on the determined voice coil voltage, current and velocity values.

13. The machine readable medium of claim 12, wherein the instructions that cause a system to estimate voice coil resistance include instructions that cause a system to determine the voice coil voltage, voice coil current and voice coil velocity values while a voice coil motor (VCM), that drives the voice coil, is not in saturation.

14. The machine readable medium of claim 13, wherein the instructions that cause a system to estimate voice coil resistance include instructions that cause a system to determine the voice coil voltage, voice coil current and voice coil velocity values during deceleration of the voice coil.

15. The machine readable medium of claim 14, wherein the instructions that cause a system to estimate voice coil resistance include instructions that cause a system to determine the voice coil voltage, voice coil current and voice coil velocity values during a portion of the deceleration where voice coil current is substantially settled.

16. The machine readable medium of claim 12, wherein the instructions that cause a system to estimate voice coil resistance include instructions that cause a system to determine each voice coil current value based on a current command.

17. The machine readable medium of claim 12, wherein the instructions that cause a system to estimate voice coil resistance include instructions that cause a system to determine each voice coil current value based on a voltage measurement across a sense resistor.

18. The machine readable medium of claim 12, wherein the instructions that cause a system to estimate voice coil resistance include instructions that cause a system to determine the at least one voice coil voltage value based on at least one voltage sample produced during the seek operation.

19. The machine readable medium of claim 12, wherein the instructions that cause a system to estimate voice coil resistance use the following equation:

$$R_{coil}=(V_{coil}-\omega K_T)/I_{coil},$$

where
- $R_{coil}$ is the estimated coil resistance;
- $V_{coil}$ is the coil voltage measured during a seek deceleration;
- $I_{coil}$ is the corresponding coil current during the seek deceleration;
- $\omega$ is the corresponding coil velocity, during the seek deceleration, as determined based on servo information; and
- $K_T$ is a know constant.

20. The machine readable medium of claim 19, wherein each voice coil current value is determined based on a current command or based on a voltage measured across a sense resistor.

* * * * *

UNITED STATES PATENT AND TRADEMARK OFFICE
CERTIFICATE OF CORRECTION

PATENT NO. : 6,917,486 B2
DATED : July 12, 2005
INVENTOR(S) : Brian Tanner

It is certified that error appears in the above-identified patent and that said Letters Patent is hereby corrected as shown below:

Column 9,
Line 22, replace "time" with -- times --;

Column 10,
Line 39, replace "know" with -- known --.

Signed and Sealed this

Fourth Day of October, 2005

JON W. DUDAS
*Director of the United States Patent and Trademark Office*